United States Patent
Zhang et al.

(10) Patent No.: US 9,946,085 B2
(45) Date of Patent: Apr. 17, 2018

(54) 3D PANEL, METHOD FOR PRODUCING THE SAME, AND 3D DISPLAY APPARATUS HAVING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventors: Zhenyu Zhang, Beijing (CN); Changgang Huang, Beijing (CN); Yanping Liao, Beijing (CN)

(73) Assignees: BOE TECHNOLOGY GROUP CO., LTD., Bejing (CN); BEIJING BOE TECHNOLOGY CO., LTD., Beijing (CN)

( * ) Notice: Subject to any disclaimer, the term of this patent is extended or adjusted under 35 U.S.C. 154(b) by 361 days.

(21) Appl. No.: 14/770,008

(22) PCT Filed: Jan. 30, 2015

(86) PCT No.: PCT/CN2015/071968
§ 371 (c)(1),
(2) Date: Aug. 24, 2015

(87) PCT Pub. No.: WO2016/050025
PCT Pub. Date: Apr. 7, 2016

(65) Prior Publication Data
US 2016/0252735 A1    Sep. 1, 2016

(30) Foreign Application Priority Data

Sep. 30, 2014    (CN) .......................... 2014 1 0520459

(51) Int. Cl.
| | | |
|---|---|---|
| G02F 1/1343 | (2006.01) | |
| G02B 27/22 | (2018.01) | |
| G02F 1/1333 | (2006.01) | |
| G02F 1/1341 | (2006.01) | |

(52) U.S. Cl.
CPC .......... *G02B 27/22* (2013.01); *G02F 1/1341* (2013.01); *G02F 1/1343* (2013.01);
(Continued)

(58) Field of Classification Search
CPC ... G02F 2001/134381; G02F 1/134363; G02B 27/2214; G02B 27/225
See application file for complete search history.

(56) References Cited

U.S. PATENT DOCUMENTS

| | | |
|---|---|---|
| 2007/0183015 A1 | 8/2007 | Jacobs et al. |
| 2013/0278847 A1 | 10/2013 | Hong et al. |

FOREIGN PATENT DOCUMENTS

| | | |
|---|---|---|
| CN | 102819153 A | 12/2012 |
| CN | 103383510 A | 11/2013 |

(Continued)

OTHER PUBLICATIONS

Second Chinese Office Action, for Chinese Patent Application No. 201410520459.4, dated Mar. 8, 2017, 17 pages.
(Continued)

*Primary Examiner* — Phu Vu
(74) *Attorney, Agent, or Firm* — Kinney & Lange, P.A.

(57) ABSTRACT

An embodiment of the present invention provides a 3D panel. The 3D panel includes a first substrate, a second substrate, and liquid crystals configured to be filled between the first substrate and the second substrate, wherein both the first substrate and the second substrate are provided with a common electrode and a signal electrode. Since the substrates at two sides of the 3D panel of the present invention have electrodes which can be independently controlled, the switching of a grating electrode function between the upper and lower substrates can be achieved by switching the signal to the two substrates, thereby improving the application range of the 3D panel and the compatibility and versatility (Continued)

of the 3D panel. In addition, the embodiments of the present invention also disclose a method for producing the 3D panel and a 3D display apparatus having the 3D panel.

19 Claims, 4 Drawing Sheets

(52) U.S. Cl.
CPC .... *G02F 1/13439* (2013.01); *G02F 1/133345* (2013.01); *G02F 1/134309* (2013.01)

(56) References Cited

FOREIGN PATENT DOCUMENTS

| | | | |
|---|---|---|---|
| CN | 103885636 | A | 6/2014 |
| CN | 103984107 | A | 8/2014 |
| CN | 104298019 | A | 1/2015 |
| JP | H08313938 | A | 11/1996 |
| JP | 2007293270 | A | 11/2007 |
| KR | 20120130397 | A | 12/2012 |
| KR | 20130092005 | A | 8/2013 |

OTHER PUBLICATIONS

Korean Final Rejection, for Korean Patent Application No. 10-2015-7023125, dated Apr. 26, 2017, 6 pages.
International Search Report and Written Opinion from PCT Application Serial No. PCT/CN2015/071968, dated Jun. 12, 2015, 13 pages.
First Chinese Office Action, for Chinese Patent Application No. 201410520459.4, dated Aug. 1, 2016, 10 pages.
Korean Preliminary Rejection, for Korean Patent Application No. 10-2015-7023125, dated Aug. 24, 2016, 17 pages.

3D PANEL, METHOD FOR PRODUCING THE SAME, AND 3D DISPLAY APPARATUS HAVING THE SAME

CROSS-REFERENCE TO RELATED APPLICATION

This application claims the benefit of Chinese Patent Application No. 201410520459.4 filed on Sep. 30, 2014 entitled "3D Panel, Method for Producing the Same, And 3D Display Apparatus Having the Same" with the State Intellectual Property Office of China, the whole disclosure of which is incorporated herein by reference.

BACKGROUND OF THE INVENTION

Field of the Invention

The present disclosure relates to a technical field of 3D display, in particular, to an active grating 3D panel, a method for producing the same, and a 3D display apparatus having the 3D panel.

Description of the Related Art

Stereoscopic display (i.e., 3D display) has become a trend of display field. A basic principle of the stereoscopic display is to generate stereoscopic effect by parallax. In other words, a left eye of one person can only see a left eye picture and a right eye thereof only can see a right eye picture, wherein the left eye picture and the right eye picture constitute a pair of stereopicture images having parallax from each other.

One method for achieving the 3D display is to employ a serial display. Specifically, at a first time point, a display device displays the left eye picture, and at this time only the left eye of a viewer can see the displayed picture. At a second time point, the display device displays the right eye picture and only the right eye of the viewer can see the displayed picture. The viewer will feel the left and right eyes see the left and right eye pictures at the same time, due to persistence of images onto a eye retinas thereof, thereby producing a stereoscopic vision.

Another method for achieving the 3D display is to employ a parallel display. Specifically, at the same time point, a part of pixels on the display device display contents of the left eye picture, and the other part of pixels display contents of the right eye picture. Gratings, polaroid glasses or the like are used to enable the right eye to see the display content of a part of the pixels and the left eye to see the display content of the other part of the pixels, thereby producing a stereoscopic vision.

As for the 3D display mode in which 3D spectacles are needed, it gradually cannot meet users' requirements to the 3D display, because the 3D spectacles are easy to be lost and damaged, and are not convenient to be used when too many viewers are present, and the stereoscopic images cannot be presented only through the 3D display devices. For a naked eye 3D display mode, for example, grating type of naked eye 3D display apparatus, because the grating is directly provided into the display panel without needing 3D spectacles, it is more convenient for viewing and thus it gets more and more concerns.

SUMMARY OF THE INVENTION

An embodiment of the present invention provides a 3D panel for the naked eye 3D display as described above. Specifically, embodiments of the present invention provide a 3D panel, a method for producing the same and a 3D display apparatus comprising the 3D panel. It makes full use of space at two sides of the 3D display panel, and gratings having two periods are manufactured on an upper substrate and a lower substrate of the 3D panel. The switching of physical viewpoint number of 3D display in the same panel can be achieved by switching signals, and at the same time it can also achieve compatibility of the same 3D panel with two different resolutions, that is, the purpose that two 3D displays can share the same 3D panel can be achieved, and finally the economic benefits of reducing development costs can be obtained.

In accordance with one aspect of the present invention, it provides a 3D panel, comprising:
 a first substrate;
 a second substrate; and
 liquid crystals, configured to be filled between the first substrate and the second substrate,
 wherein both the first substrate and the second substrate are provided thereon with a common electrode and a signal electrode.

In one example, the first substrate comprises, in sequence from top to bottom, a first base substrate, a first common electrode, a first common electrode lead, a first insulation layer, a first signal electrode lead, a second insulation layer and a first signal electrode; and
 the second substrate comprises, in sequence from bottom to top, a second base substrate, a second common electrode, a second common electrode lead, a third insulation layer, a second signal electrode lead, a fourth insulation layer and a second signal electrode,
 wherein the first signal electrode is arranged to face the second signal electrode.

In one example, both the first signal electrode and the second signal electrode are a plurality of stripped electrodes, and an arrangement direction of the stripped electrodes in the first signal electrode is interlaced with that of the stripped electrodes in the second signal electrode.

In one example, the plurality of stripped electrodes constituting the first signal electrode are evenly arranged and have a first period;
 the plurality of stripped electrodes constituting the second signal electrode are evenly arranged and have a second period which is different from the first period.

In one example, spacing between the plurality of stripped electrodes in the first signal electrode is larger than or equals to 10 micrometers; and
 spacing between the plurality of stripped electrodes in the second signal electrode is larger than or equals to 10 micrometers.

In one example, the first common electrode lead and the first signal electrode lead are in the form of frame, and a signal access part is provided at one side of the first base substrate; and
 the second common electrode lead and the second signal electrode lead are in the form of frame, and a signal access part is provided at one side of the second base substrate.

In one example, all of the first common electrode, the first signal electrode, the second common electrode and the second signal electrode are made of transparent conductive materials.

In one example, the first and second common electrodes are planar electrodes.

In one example, the 3D panel further comprises a signal control module, configured to enable the signal electrode lead of the corresponding substrate when the first or second substrate is used as a working electrode.

In one example, in a case that the first substrate is served as the working electrode, the first common electrode lead is opened, the first signal electrode lead is accessed with a signal, the second common electrode lead and the second signal electrode lead are accessed with a common electrode signal, and the first substrate functions as a grating;

in a case that the second substrate is served as the working electrode, the second common electrode lead is opened, the second signal electrode lead is accessed with a signal, the first common electrode lead and the first signal electrode lead are accessed with a common electrode signal, and the second substrate functions as a grating.

In accordance with another aspect of the present invention, it also provides a 3D display apparatus, comprising the 3D panel as described above.

In accordance with a further aspect of the present invention, it also provides a method for producing a 3D panel, comprising the steps of:

forming a first common electrode layer on a first base substrate, which is used as a first common electrode of pixels;

forming a first conductive layer on the first common electrode, and pattering the first conductive layer to form a first common electrode lead;

forming a first insulation layer on the first common electrode lead;

forming a second conductive layer on the first insulation layer and pattering the second conductive layer to form a first signal electrode lead;

forming a second insulation layer on the first signal electrode lead, and forming vias onto the second insulation layer, which expose a partial region of the first signal electrode lead;

forming a first signal electrode layer on the second insulation layer and patterning the first signal electrode layer to form a first signal electrode, which is electrically connected with the first signal electrode lead by means of the vias, so as to obtain a first substrate;

obtaining a second substrate by repeating the same steps as those for producing the first substrate;

attaching edges of the first and second substrates together, so that the first signal electrode of the first substrate faces the second signal electrode of the second substrate, and liquid crystals are filled between the first substrate and the second substrate, thereby forming the 3D panel.

By producing single electrodes onto substrates at two sides of the 3D panel, the present invention achieves the switching of viewpoint number in terms of physical level, so that the viewpoint number can be adjusted. In addition, the electrodes on substrates at two sides of the 3D panel in the present invention can be controlled independently. The switching of a grating electrode function between the upper and lower substrates can be achieved by switching the signals to the two substrates, thereby improving the application range of the 3D panel and the compatibility and versatility of the 3D panel.

DETAILED DESCRIPTION OF PREFERRED EMBODIMENTS OF THE INVENTION

In order that objects, solutions and advantages of the present disclosure will become more apparent and explicit, the embodiments will be described hereinafter in detail with reference to the accompanied drawings.

Figure 1:
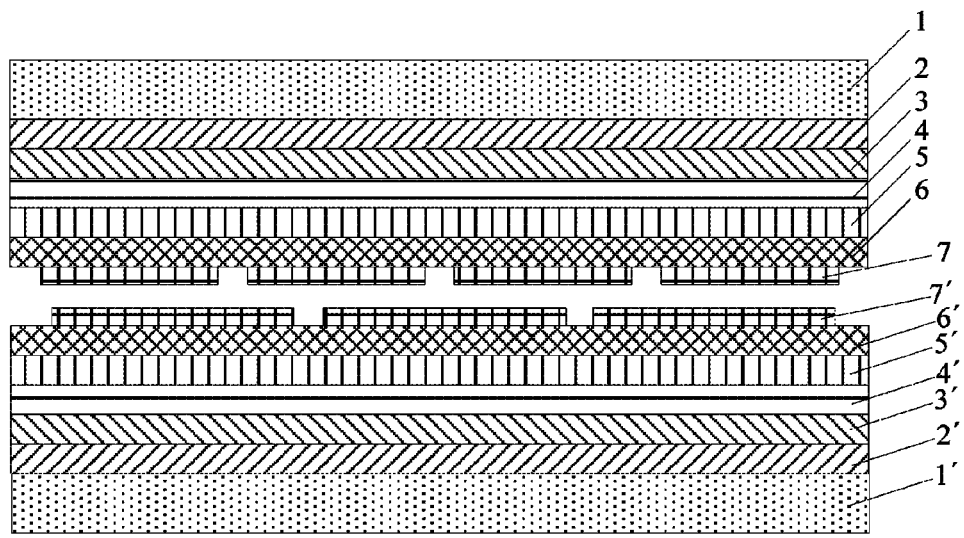
FIG. 1 is a schematic sectional view showing a structure of 3D panel in accordance with an embodiment of the present invention.

In accordance with one aspect of the present invention, it provides a 3D panel, for example, for a naked eye 3D display. As shown in FIG. 1, the 3D panel includes a first substrate, a second substrate, and liquid crystals filled between the first substrate and the second substrate. Both the first substrate and the second substrate are provided with a common electrode and a signal electrode.

In an embodiment of the present invention, the first substrate includes, in sequence from top to bottom, a first base substrate 1, a first common electrode 2, a first common electrode lead 3, a first insulation layer 4, a first signal electrode lead 5, a second insulation layer 6 and a first signal electrode 7. The first base substrate 1 can be made from glasses, silicon wafer, quartz, plastics or the similar materials.

The first common electrode 2 and the first signal electrode 7 are made from a transparent conductive material, which may be a transparent metal film, a transparent metallic oxide film, a non-metallic oxide film, ferroelectric materials dispersed with conductive particles or the like. The film may be in the form of a single layer, two layers, a plurality of layers or multiple layers, non-doping type, doping type, or multi-elements type. Preferably, the transparent conducive material is a metallic oxide film, for example an ITO film.

The first common electrode lead 3 and the first signal electrode lead 5 are made of a conductive material. Preferably, such conductive material is metal material.

The first insulation layer 4 is used to insulate the first common electrode lead 3 from the first signal electrode lead 5.

A plurality of vias are formed on the second insulation layer 6, so as to partially insulate the first signal electrode lead 5 from the first signal electrode 7. The vias can expose a partial region of the first signal electrode lead 5. The first signal electrode 7 is electrically connected with the first signal electrode lead 5 by means of the vias.

The first insulation layer 4 and the second insulation layer 6 are made of a transparent insulation material.

Figure 3A:
FIGS. 3A-3F' are flow charts showing a producing process of the 3D panel in accordance with an embodiment of the present invention.
Figure 3A:

In an example of the present invention, the first common electrode lead 3 and the first signal electrode lead 5 are in the form of frame. A signal access part is provided at one side of the first base substrate 1. It should be understood by those skilled in the art that the signal access part of the first common electrode lead 3 and the signal access part of the first signal electrode lead 5 are positioned close to each other (as shown in FIG. 3D), in order to facilitate accessing of signal. This cannot be interpreted as limiting to the present invention.

Figure 3B:
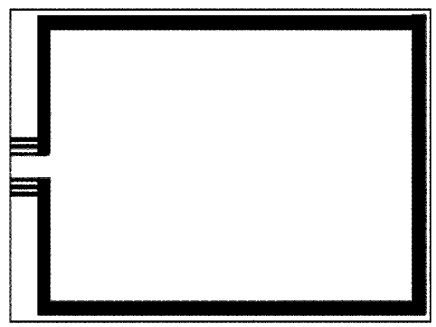
Figure 3B:
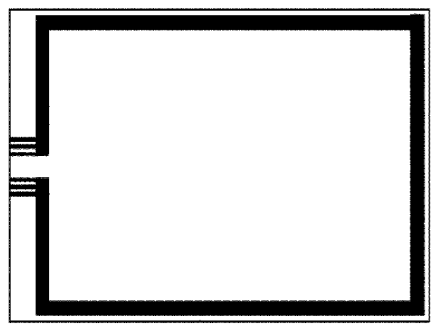
Figure 3C:
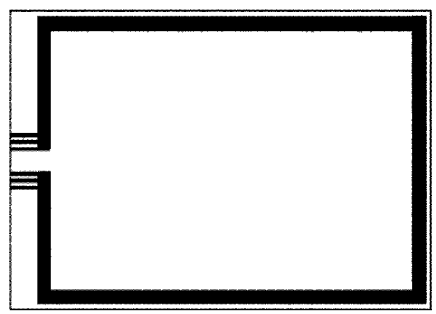
Figure 3C:
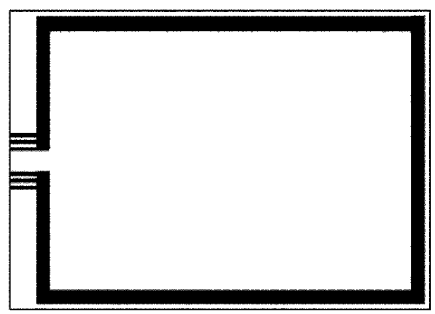
Figure 3D:
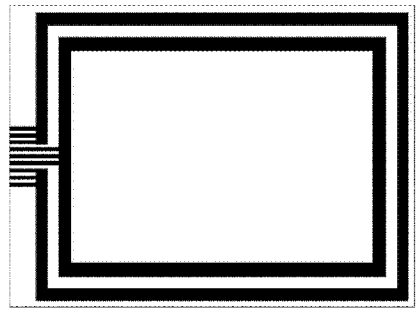
Figure 3D:
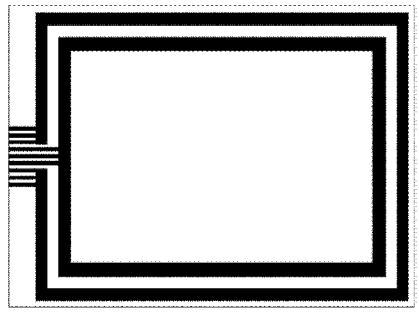

Further, the first common electrode lead 3 is located at an outer periphery of the first base substrate 1 (as shown in FIG. 3B), and the first signal electrode lead 5 is located at an inner side of the first common electrode lead 3 (as shown in FIG. 3D).

Of course, the first common electrode lead 3 and the first signal electrode lead 5 may be in other forms, as long as they can be electrically connected with the first common electrode 2 and the first signal electrode 7, respectively.

In one example of the present invention, the first common electrode 2 can be a planar electrode, and the first signal electrode 7 can be composed of a plurality of stripped electrodes.

In one example of the present invention, the first signal electrode 7 is composed of a plurality of stripped electrodes, each of which is electrically connected with the first signal electrode lead 5 by the respective vias. Further, the plurality of stripped electrodes are placed to be inclined. In one preferable example, the plurality of stripped electrodes of the first signal electrode 7 are evenly arranged and have a first period.

In an embodiment of the present invention, the second substrate includes, in sequence from bottom to top, a second base substrate 1', a second common electrode 2', a second common electrode lead 3', a third insulation layer 4', a second signal electrode lead 5', a fourth insulation layer 6' and a second signal electrode 7'. The second base substrate 1' can be made from glasses, silicon wafer, quartz, plastics or the similar materials.

The second common electrode 2' and the second signal electrode 7' are made from a transparent conductive material, which may be a transparent metal film, a transparent metallic oxide film, non-metallic oxide film, or ferroelectric materials dispersed with conductive particles. The film may be in the form of a single layer, two layers, a plurality of layers or multiple layers, non-doping type, doping type, or multi-elements type. Preferably, the transparent conducive material is a metallic oxide film, for example ITO film.

The second common electrode lead 3' and the second signal electrode lead 5' are made of a conductive material. Preferably, such conductive material is metal material.

The third insulation layer 4' is used to insulate the second common electrode lead 3' from the second signal electrode lead 5'.

A plurality of vias are formed on the fourth insulation layer 6', so as to partially insulate the second signal electrode lead 5' from the second signal electrode 7'. The vias can expose a partial region of the second signal electrode lead 5'. The second signal electrode 7' is electrically connected with the second signal electrode lead 5' by means of the vias.

The third insulation layer 4' and the fourth insulation layer 6' are made of a transparent insulation material.

In an example of the present invention, the second common electrode lead 3' and the second signal electrode lead 5' are in the form of frame. A signal access part is provided at one side of the second base substrate 1'. It should be understood by those skilled in the art that the signal access part of the second common electrode lead 3' and the signal access part of the second signal electrode lead 5' are positioned close to each other (as shown in FIG. 3D'), in order to facilitate accessing of signal. This cannot be interpreted as limiting to the present invention.

Further, the second common electrode lead 3' is located at an outer periphery of the second base substrate 1' (as shown in FIG. 3B'), and the second signal electrode lead 5' is located at an inner side of the second common electrode lead 3' (as shown in FIG. 3D').

Of course, the second common electrode lead 3' and the second signal electrode lead 5' may be in other forms, as long as they can be electrically connected with the second common electrode 2' and the second signal electrode 7', respectively.

In one example of the present invention, the second common electrode 2' can be a planar electrode, and the second signal electrode 7' can be composed of a plurality of stripped electrodes.

In one example of the present invention, the second signal electrode 7' is composed of a plurality of stripped electrodes, each of which is electrically connected with the second signal electrode lead 5' by the respective vias. Further, the plurality of stripped electrodes are placed to be inclined. In one preferable example, the plurality of stripped electrodes of the second signal electrode 7' are evenly arranged and have a second period which is different from the first period.

The first signal electrode 7 is disposed to face the second signal electrode 7'.

Figure 3E:
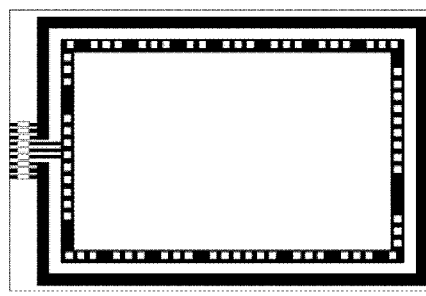
Figure 3E:
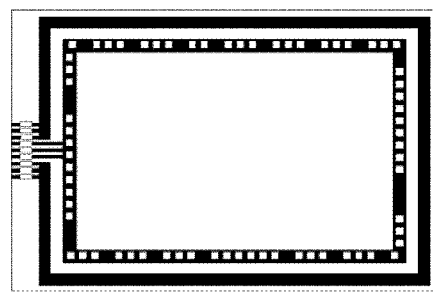
Figure 3F:
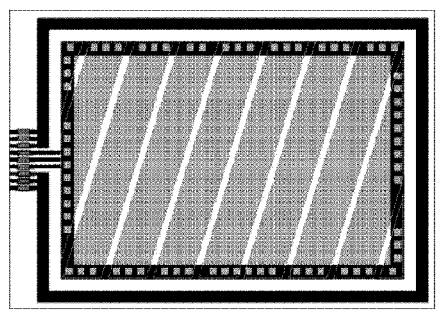
Figure 3F:
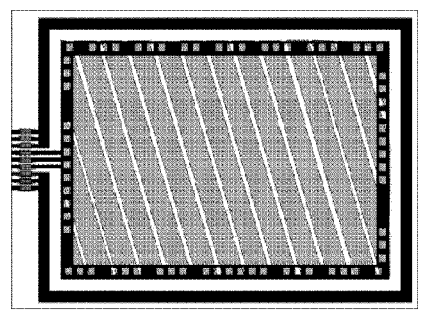

In one example of the present invention, the stripped electrodes of the first signal electrode 7 and those of the second signal electrode 7' are arranged to interlace with each other. For example, as shown in FIGS. 3F and 3F', the stripped electrodes of the first signal electrode 7 and those of the second signal electrode 7' are respectively arranged to be inclined, and they are inclined in different directions. That is, the stripped electrodes of the first signal electrode 7 are not parallel to those of the second signal electrode 7'.

Further, the first substrate and the second substrate have the same structure, and they are attached together in such way that the signal electrodes thereof face each other. In this way, the 3D panel is symmetrical with respect to an axis which is a center line between the first substrate and the second substrate. In the present example, because the first and second substrate are identical in terms of structure, when producing the first substrate and the second substrate, for example, producing the common electrode lead, the signal electrode lead and other identical pattern designs, the same mask can be used. Due to the above-mentioned shared designs of the mask, it is possible to reduce the producing cost of the 3D panel.

In the above examples, an enabling time of inputting signals to the first signal electrode 7 is different from that of inputting signals to the second signal electrode 7', for example, the time of inputting signals to the first signal electrode 7 and that of inputting signals to the second signal electrode 7' being stagger. In this way, switching the viewpoint number of the 3D panel in terms of physical level can be achieved by switching signals of the first and second substrates. Also, two kinds of liquid crystal panels having different resolutions can be incorporated into one and the same 3D panel, that is, to achieve the purpose of two kinds of 3D display devices sharing the same 3D panel, and finally to obtain the economic benefits of reducing the development costs.

In one example of the present invention, the 3D panel also includes a signal control module, configured to enable the signal electrode lead of the corresponding substrate when the viewpoints of the first or second substrate are switched on, i.e., the signal electrode lead of the corresponding substrate is accessed with the signal (the signal is inputted into the signal electrode lead of the corresponding substrate). Specifically, when the viewpoints of the first substrate are switched on, that is, the first substrate is served as a working electrode, the first common electrode lead 3 is opened, the first signal electrode lead 5 is accessed with the signal, the second common electrode lead 3' and the second signal electrode lead 5' are accessed with a common electrode signal. At this time, the first substrate functions as a grating. When the viewpoints of the second substrate are switched on, that is, the second substrate is served as a working electrode, the second common electrode lead 3' is opened, the second signal electrode lead 5' is accessed with the signal, the first common electrode lead 3 and the first signal electrode lead 5 are accessed with a common electrode signal. At this time, the second substrate functions as a grating. As such, the viewpoint number of the 3D panel can be adjusted as actually required. In addition, since the electrodes on the substrates at two sides of the 3D panel according to the present invention can be controlled independently, the switching of the grating electrode function between the first and second substrates (i.e., an upper substrate and a lower substrate) can be achieved by switching the signals to the two substrates, thereby improving the application range of the 3D panel and the compatibility and versatility of the 3D panel.

Figure 2:
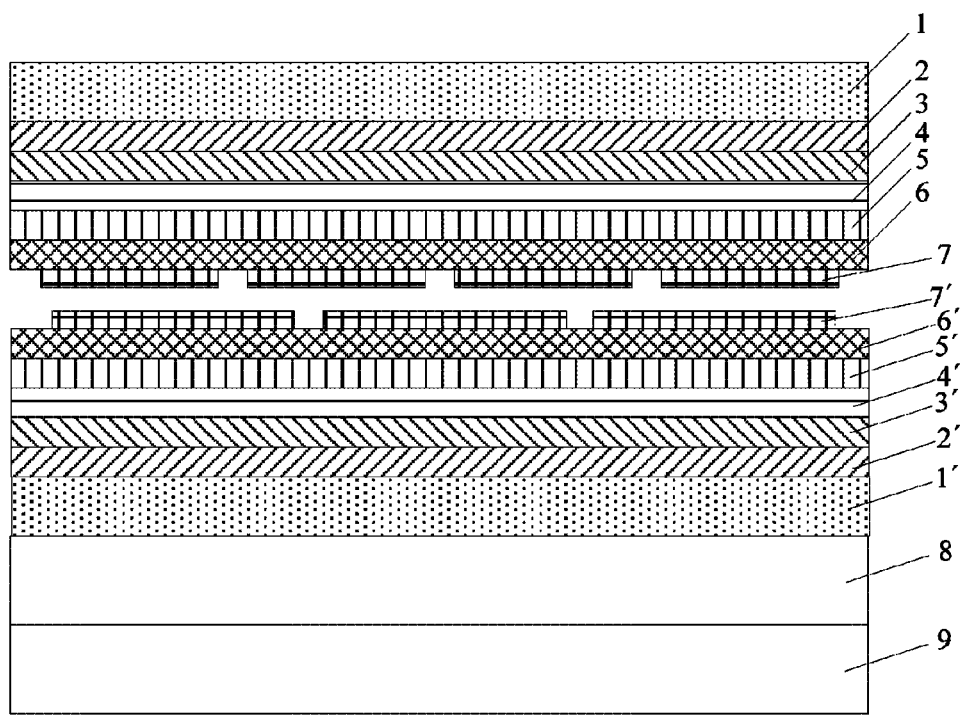
FIG. 2 is a schematic sectional view showing a structure of 3D panel in accordance with an embodiment of the present invention.

In accordance with another aspect of the present invention, it also provides a 3D display panel, which includes the above 3D panel, an insulating glass 8 and a LCD panel 9, as shown in FIG. 2.

In accordance with a further aspect of the present invention, it also provides a 3D display apparatus, including the 3D panel as described above.

In accordance with a further aspect of the present invention, it also provides a producing method for the 3D panel, for example, as shown in FIGS. 3A-3F', including the following steps.

A first common electrode layer is formed on a first base substrate 1, serving as a first common electrode 2 (Vcom) of pixels, wherein the first common electrode 2 is a planar electrode, as shown in FIG. 3A.

Preferably, the first base substrate 1 can be made from glasses, silicon wafer, quartz, plastics or the similar materials.

The first common electrode layer is made from a transparent conductive material, and thus is not shown in FIG. 3. The transparent conductive material may be a transparent metal film, a transparent metallic oxide film, a non-metallic oxide film, or ferroelectric materials dispersed with conductive particles. The film may be in the form of a single layer, two layers, a plurality of layers or multiple layers, non-doping type, doping type, or multi-elements type. Preferably, the transparent conducive material is a metallic oxide film, for example an ITO film.

A first conductive layer is formed on the first common electrode 2, and a first common electrode lead 3 is formed by a patterning process, as shown in FIG. 3B. The first conductive layer is made of a conductive material, and preferably the conductive material is metal material. Furthermore, the first conductive layer can be formed by a deposition process, and the first common electrode lead 3 can be formed by the patterning process such as exposing, etching or the like.

In one example of the present invention, the first common electrode lead 3 is in the form of frame. A signal access part is provided at one side of the first base substrate 1.

Of course, the first common electrode lead 3 can also be in other forms, as long as it can be electrically connected with the first common electrode 2.

A first insulation layer 4 is formed on the first common electrode lead 3, to insulate the first common electrode lead 3 from the first signal electrode lead 5, as shown in FIG. 3C. Because the first insulation layer 4 is made of a transparent insulation material, it is not shown in FIG. 3C. The first insulation layer 4 can be formed by a process, such as depositing.

A second conductive layer is formed on the first insulation layer 4, and a first signal electrode lead 5 is formed by a patterning process, as shown in FIG. 3D. The second conductive layer is made of a conductive material. Preferably, the conductive material is metal material. Furthermore, the second conductive layer can be formed by a deposition process, and the first signal electrode lead 5 can be formed by the patterning process such as exposing, etching or the like.

In an example of the present invention, the first signal electrode lead 5 is also in the form of frame. Also, a signal access part of the first signal electrode lead 5 is provided at the same side where the signal access part of the first common electrode lead 3 is located. It should be understood by those skilled in the art that the signal access part of the first common electrode lead 3 and the signal access part of the first signal electrode lead 5 are positioned close to each other, in order to facilitate accessing of signal. This cannot be interpreted as limiting to the present invention.

Similarly, the first signal electrode lead 5 may also be in other forms, as long as it can be electrically connected with the first signal electrode 7.

A second insulation layer 6 is formed on the first signal electrode lead 5, and a plurality of vias are formed on the second insulation layer 6, so as to partially insulate the first signal electrode lead 5 from the first signal electrode 7. The vias can expose a partial region of the first signal electrode lead 5, as shown in FIG. 3E. Because the second insulation layer 6 is made of a transparent insulation material, it is not shown in FIG. 3E. The second insulation layer 6 can be formed by a process, such as depositing; and the vias can be formed by a process such as etching.

A first signal electrode layer is formed on the second insulation layer 6, and a first signal electrode 7 can be formed by a patterning process. The first signal electrode 7 is electrically connected with the first signal electrode lead 5 through vias. In this way, the first substrate is obtained as shown in FIG. 3F.

Specifically, the first signal electrode 7 is made from a transparent conductive material, which may be a transparent metal film, a transparent metallic oxide film, a non-metallic oxide film, or ferroelectric materials dispersed with conductive particles. The film may be in the form of a single layer, two layers, a plurality of layers or multiple layers, non-doping type, doping type, or multi-elements type. Preferably, the transparent conducive material is a metallic oxide film, for example an ITO film.

In one example of the present invention, the first signal electrode 7 is composed of a plurality of stripped electrodes, each of which is electrically connected with the first signal electrode lead 5 by the respective vias. Further, the plurality of stripped electrodes are placed to be inclined. In one preferable example, the plurality of stripped electrodes of the first signal electrode 7 are evenly arranged and have a first period.

The second substrate can be obtained by repeating the above steps, as shown in FIGS. 3A', 3B', 3C', 3D', 3E', and 3F'. The difference is that when producing the second signal electrode 7' of the second substrate, it should be ensured that the arrangement direction of the plurality of stripped electrodes within the second signal electrode 7' are interlaced with that of the plurality of stripped electrodes within the first signal electrode 7. For example, as shown in FIGS. 3F and 3F', the inclination directions of the plurality of stripped electrodes within the first signal electrode 7 and the plurality of stripped electrode within the second signal electrode 7' are different from each other. In one preferable example, the plurality of stripped electrodes of the second signal electrode 7' are evenly arranged and have a second period which is different from the first period. In addition, the spacing between the plurality of stripped electrodes within the first signal electrode 7 is larger or equals to 10 micrometers, and the spacing between the plurality of stripped electrodes within the second signal electrode 7' is larger or equals to 10 micrometers.

The first substrate and the second substrate are attached together, and liquid crystals are filled between the first substrate and the second substrate, so as to form the 3D panel.

Further, the first substrate and the second substrate have the same structure, and they are attached together in such way that the signal electrodes thereof face each other. In this way, the 3D panel is symmetrical with respect to an axis which is a center line between the first substrate and the second substrate. In the present example, because the first and second substrate are identical in terms of structure, when the second common electrode lead 3' and the second signal electrode lead 5' as well as other identical pattern designs are formed on the second substrate, the same mask as used for producing the first substrate can be used. Due to the above shared designs of the mask, it is possible to reduce the producing cost of the 3D panel.

Figure 4:
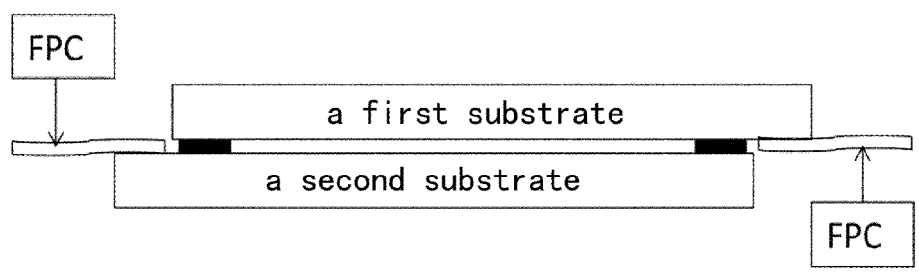
FIG. 4 is a sectional view of the produced 3D panel in accordance with an embodiment of the present invention.

In one example of the present invention, the first substrate is attached to the second substrate by the necessary materials such as TN mode liquid crystals, sphere spacers, and polarizers. FIG. 4 is a sectional view showing the 3D display panel obtained in accordance with one embodiment of the present invention. As shown in FIG. 4, the common electrode leads and signal electrode leads of the first and second substrates are respectively connected to a flexible printed circuit (FPC) board by anisotropic conductive adhesives; and the two dark regions between the first and second substrates are sealant.

Currently, an active type grating 3D display panel is conventionally designed with only one periodic grating, and thus it is compatible with only one viewpoint number display of a liquid crystal panel. In this way, it is not convenient for utilization by the user and production by the manufacturers. With the 3D panel produced by the above technical solutions in accordance with the present invention, an upper substrate and a lower substrate thereof (i.e., the first and second substrate) are formed with the common electrode and the signal electrode thereon, but the signal electrodes of the first and second substrates have enabling times which are staggered. The times when the signal electrodes of the first substrate and the second substrate are accessed with the signals are staggered. In this way, switching the viewpoint number of the 3D panel in terms of physical level can be achieved by switching signals between the first and second substrates. Also, two kinds of liquid crystal panels having different resolutions can be incorporated into one 3D panel, that is, to achieve the purpose of two kinds of 3D display devices sharing the same 3D panel, and finally to obtain the economic benefits of reducing the development costs.

With the 3D panel produced by the above technical solutions, the signal electrode lead of the corresponding substrate is enabled when the viewpoints of the first or second substrate are switched on, i.e., the signal electrode lead of the corresponding substrate is accessed with the signal. Specifically, when the viewpoints of the first substrate are switched on, that is, the first substrate is served as a working electrode, the first common electrode lead is opened, the first signal electrode lead is accessed with the signal, the second common electrode lead and the second signal electrode lead are accessed with a common electrode signal. At this time, the first substrate functions as a grating. When the viewpoints of the second substrate are switched on, that is, the second substrate is served as a working electrode, the second common electrode lead is opened, the second signal electrode lead is accessed with the signal, the first common electrode lead and the first signal electrode lead are accessed with a common electrode signal. At this time, the second substrate functions as a grating. As such, the viewpoint number of the 3D panel can be adjusted as actually required. In addition, since the electrodes on the substrates at two sides of the 3D panel according to the present invention can be controlled independently, the switching of the grating electrode function between the first and second substrates (i.e., the upper and lower substrates) can be achieved by switching the signals to the two substrates, thereby improving the application range of the 3D panel and the compatibility and versatility of the 3D panel.

The objects, solutions and advantageous effects of the present disclosure have been described in details with reference to the above specific embodiments. It should be understood that the above embodiments are given only by ways of examples instead of limiting the present invention. Any changes, equivalent replacement, modification within the spirit and principles of the disclosure can be made by those skilled in the art and should fall into the scope of the present invention.

What is claimed is:

1. A 3D panel, comprising:
   a first substrate;
   a second substrate;
   liquid crystals filled between the first substrate and the second substrate,
   wherein both the first substrate and the second substrate are provided with a common electrode and a signal electrode, and
   wherein the 3D panel further comprises a signal control module, configured to enable the signal electrode lead of the corresponding substrate when the first or second substrate is used as a working electrode.

2. The 3D panel according to claim 1, wherein
   the first substrate comprises, in sequence from top to bottom, a first base substrate, a first common electrode, a first common electrode lead, a first insulation layer, a first signal electrode lead, a second insulation layer and a first signal electrode; and
   the second substrate comprises, in sequence from bottom to top, a second base substrate, a second common electrode, a second common electrode lead, a third insulation layer, a second signal electrode lead, a fourth insulation layer and a second signal electrode,
   wherein the first signal electrode is arranged to face the second signal electrode.

3. The 3D panel according to claim 2, wherein
   both the first signal electrode and the second signal electrode are composed of a plurality of stripped electrodes, and an arrangement direction of the stripped electrodes in the first signal electrode is interlaced with that of the stripped electrodes in the second signal electrode.

4. The 3D panel according to claim 3, wherein
   the plurality of stripped electrodes in the first signal electrode are evenly arranged and have a first period;
   the plurality of stripped electrodes in the second signal electrode are evenly arranged and have a second period which is different from the first period.

5. The 3D panel according to claim 3, wherein
   spacing between the plurality of stripped electrodes in the first signal electrode is larger than or equal to 10 micrometers; and spacing between the plurality of stripped electrodes in the second signal electrode is larger than or equal to 10 micrometers.

6. The 3D panel according to claim 2, wherein
the first common electrode lead and the first signal electrode lead are in the form of a frame, and a signal access part is provided at one side of the first base substrate; and
the second common electrode lead and the second signal electrode lead are in the form of a frame, and a signal access part is provided at one side of the second base substrate.

7. The 3D panel according to claim 2, wherein
all of the first common electrode, the first signal electrode, the second common electrode and the second signal electrode are made of transparent conductive materials.

8. The 3D panel according to claim 2, wherein
the first and second common electrodes are planar electrodes.

9. The 3D panel according to claim 1, wherein
in a case that the first substrate is served as the working electrode, the first common electrode lead is opened, the first signal electrode lead is accessed with a signal, the second common electrode lead and the second signal electrode lead are accessed with a common electrode signal, and the first substrate functions as a grating;
in a case that the second substrate is served as the working electrode, the second common electrode lead is opened, the second signal electrode lead is accessed with a signal, the first common electrode lead and the first signal electrode lead are accessed with a common electrode signal, and the second substrate functions as a grating.

10. A 3D display apparatus, comprising the 3D panel according to claim 1.

11. A method for producing a 3D panel, comprising the steps of:
forming a first common electrode layer on a first base substrate, which is used as a first common electrode of pixels;
forming a first conductive layer on the first common electrode, and pattering the first conductive layer to form a first common electrode lead;
forming a first insulation layer on the first common electrode lead;
forming a second conductive layer on the first insulation layer and pattering the second conductive layer to form a first signal electrode lead;
forming a second insulation layer on the first signal electrode lead, and forming vias onto the second insulation layer, the vias exposing a partial region of the first signal electrode lead;
forming a first signal electrode layer on the second insulation layer and patterning the first signal electrode layer to form a first signal electrode, which is electrically connected with the first signal electrode lead by means of vias, so as to obtain a first substrate;
obtaining a second substrate by repeating the same steps as above-mentioned for producing the first substrate;
attaching edges of the first and second substrates together, so that the first signal electrode of the first substrate faces the second signal electrode of the second substrate, and liquid crystals are filled between the first substrate and the second substrate, thereby forming the 3D panel.

12. The method according to claim 11, wherein
both the first signal electrode and the second signal electrode are composed of a plurality of stripped electrodes, and the first signal electrode and the second signal electrode are disposed so that an arrangement direction of the stripped electrodes in the first signal electrode is interlaced with that of the stripped electrodes in the second signal electrode.

13. The method according to claim 12, wherein
the plurality of stripped electrodes in the first signal electrode are evenly arranged and have a first period;
the plurality of stripped electrodes in the second signal electrode are evenly arranged and have a second period which is different from the first period.

14. The method according to claim 11, wherein
all of the first common electrode, the first signal electrode, the second common electrode and the second signal electrode are made of transparent conductive materials.

15. The method according to claim 11, wherein
the first common electrode in the first substrate and the second common electrode in the second substrate are planar electrodes.

16. The method according to claim 11, wherein
the signal electrode lead of the corresponding substrate is enabled when the first or second substrate is used as a working electrode.

17. The 3D panel according to claim 4, wherein:
spacing between the plurality of stripped electrodes in the first signal electrode is larger than or equal to 10 micrometers; and
spacing between the plurality of stripped electrodes in the second signal electrode is larger than or equal to 10 micrometers.

18. The 3D display apparatus according to claim 10, wherein:
the first substrate comprises, in sequence from top to bottom, a first base substrate, a first common electrode, a first common electrode lead, a first insulation layer, a first signal electrode lead, a second insulation layer and a first signal electrode; and
the second substrate comprises, in sequence from bottom to top, a second base substrate, a second common electrode, a second common electrode lead, a third insulation layer, a second signal electrode lead, a fourth insulation layer and a second signal electrode,
wherein the first signal electrode is arranged to face the second signal electrode.

19. The 3D display apparatus according to claim 18, wherein both the first signal electrode and the second signal electrode are composed of a plurality of stripped electrodes, and an arrangement direction of the stripped electrodes in the first signal electrode is interlaced with that of the stripped electrodes in the second signal electrode.

* * * * *